UNITED STATES PATENT OFFICE.

HAROLD R. MURDOCK, OF NAUGATUCK, CONNECTICUT, ASSIGNOR TO RUBBER REGENERATING COMPANY, A CORPORATION OF INDIANA.

VULCANIZING PROCESS.

1,204,374. Specification of Letters Patent. Patented Nov. 7, 1916.

No Drawing. Application filed May 4, 1916. Serial No. 95,359.

*To all whom it may concern:*

Be it known that I, HAROLD R. MURDOCK, a citizen of the United States, residing at Naugatuck, county of New Haven, and State of Connecticut, have invented certain new and useful Improvements in Vulcanizing Processes, of which the following is a full, clear, and exact description.

This invention relates to a process for vulcanizing rubber and is more particularly directed to a process for producing light-colored or substantially white articles.

In the manufacture of many kinds of rubber articles it is common practice, in order to hasten the vulcanization of the rubber, to add litharge or some other suitable compound of lead. The articles produced by such treatment ordinarily have a black color due in large part to the production of lead sulfid therein during the vulcanizing process. The black color has been masked heretofore by the addition of white pigments. The lead sulfid under these circumstances remains as such and if present in sufficient quantity lends a muddy color to the product or else requires a large addition of pigment to counteract its influence.

The object of the present invention accordingly has been to produce a vulcanized material containing sulfur and lead which in itself shall possess a light or substantially white color without the presence of masking pigments. Briefly stated I have found that this object may be accomplished by adding to the rubber zinc sulfate or a water soluble salt capable of reacting with the sulfid of lead to form light-colored water-insoluble compounds.

In carrying out the preferred process embodying my invention the rubber which has been mixed with a suitable proportion of litharge and sulfur is milled with from five to ten per cent. of dry zinc sulfate. The rubber batch preferably contains .25% to .50% of water and the moisture content is kept between these limits during the mixing. This water may be added if the stock has been previously dried or if wet stock is employed drying to the moisture content indicated is carried on. After the mixture has been thoroughly milled it may be made up into any desired shapes and vulcanized by any of the well-known methods.

The reaction which takes place in carrying out the process as outlined results in the production of lead sulfate and zinc sulfid, both of which are insoluble in water and are of a light color. The reaction generally may be indicated as follows:

$$PbS + MA = MS + PbA$$

in which M represents the metal of the salt and A the acid radical of the salt. The zinc sulfate, of course, may be replaced by numerous other salts capable of producing water-insoluble light-colored products with the lead and sulfur. Some of these substances are:—zinc chlorid, oxychlorids of arsenic or antimony, chlorids or sulfates of arsenic, antimony, cadmium, tin, etc. It will be noted that the term "light colored" as here used is intended to include the color imparted by the yellow sulfids of arsenic and antimony, the orange sulfid of cadmium, etc.

In carrying out the invention it is preferable to employ rubber free from compounds such as sugars, proteids, water-soluble inorganic salts, etc., as such rubber is more susceptible to the change and gives a better and whiter article than if such foreign bodies are present in the mixture. It will further be observed that the quantity of water to be employed will depend upon the mixture which is being treated .25% to .50% has been found to be ordinarily sufficient representing an amount insufficient to cause the cured product to become porous.

The product formed by the process above outlined has been found to possess excellent characteristics and is of a light or substantially white color.

It will be further noted that in carrying out the process as above described reclaimed rubber containing lead compounds may be employed with the new rubber in the batch. The lead present as lead sulfid will be transformed according to the equation given above into the products indicated. It is, of course, preferable, that the reclaimed rubber be free from carbonaceous and other materials likely to char.

As many apparently widely different embodiments of this invention can be made without departing from the spirit thereof, it is to be understood that I do not intend to limit myself to the specific form of the invention set forth except as indicated in the appended claims.

Having thus described my invention what I claim as new and desire to protect by Letters Patent is:

1. The process of treating rubber for vulcanization, which comprises adding vulcanizing material thereto containing lead and sulfur, and a reactive material adapted to produce a light-colored water-insoluble compound with said lead upon vulcanization, and vulcanizing the mixture.

2. The process of treating rubber for vulcanization, which comprises adding vulcanizing material thereto containing lead and sulfur, and a reactive material adapted to produce light-colored water-insoluble compounds with the lead and sulfur upon vulcanization and vulcanizing the mixture.

3. The process of treating rubber for vulcanization, which comprises adding vulcanizing material thereto containing lead and sulfur, and a substance having an acid radical adapted to form a light-colored water-insoluble salt with lead upon vulcanization, and vulcanizing the mixture.

4. The process of treating rubber for vulcanization, which comprises adding vulcanizing material thereto containing lead and sulfur, and a reactive substance comprising a metal and an acid radical adapted to form with the sulfur and lead respectively a light-colored water-insoluble sulfid and a light-colored water-insoluble lead salt, and vulcanizing the mixture.

5. The process of treating rubber for vulcanization, which comprises adding vulcanizing material thereto containing lead and sulfur and zinc sulfate, said zinc sulfate being adapted to convert the lead sulfid formed upon vulcanization into lead sulfate and zinc sulfid, and vulcanizing the mixture.

6. The process of treating rubber for vulcanization, which comprises adding vulcanizing material thereto containing lead and sulfur, and a water-soluble reactive substance, in the presence of water, made up of a metal and an acid radical forming with sulfur and lead respectively a light-colored water-insoluble sulfid, and a light-colored water-insoluble lead salt upon vulcanization, and vulcanizing the mixture.

7. As a new composition of matter, vulcanized rubber substantially free from lead sulfid and containing a light-colored water-insoluble compound of lead.

8. As a new composition of matter, vulcanized rubber substantially free from lead sulfid and containing light-colored water-insoluble compounds of lead and sulfur.

9. As a new composition of matter, vulcanized rubber substantially free from lead sulfid and containing a light-colored water-insoluble sulfid and a light-colored water-insoluble salt of lead.

10. As a new composition of matter, vulcanized rubber substantially free from lead sulfid and containing lead sulfate and zinc sulfid.

Signed at Naugatuck, Conn., this 14th day of April, 1916.

HAROLD R. MURDOCK.